2,636,110

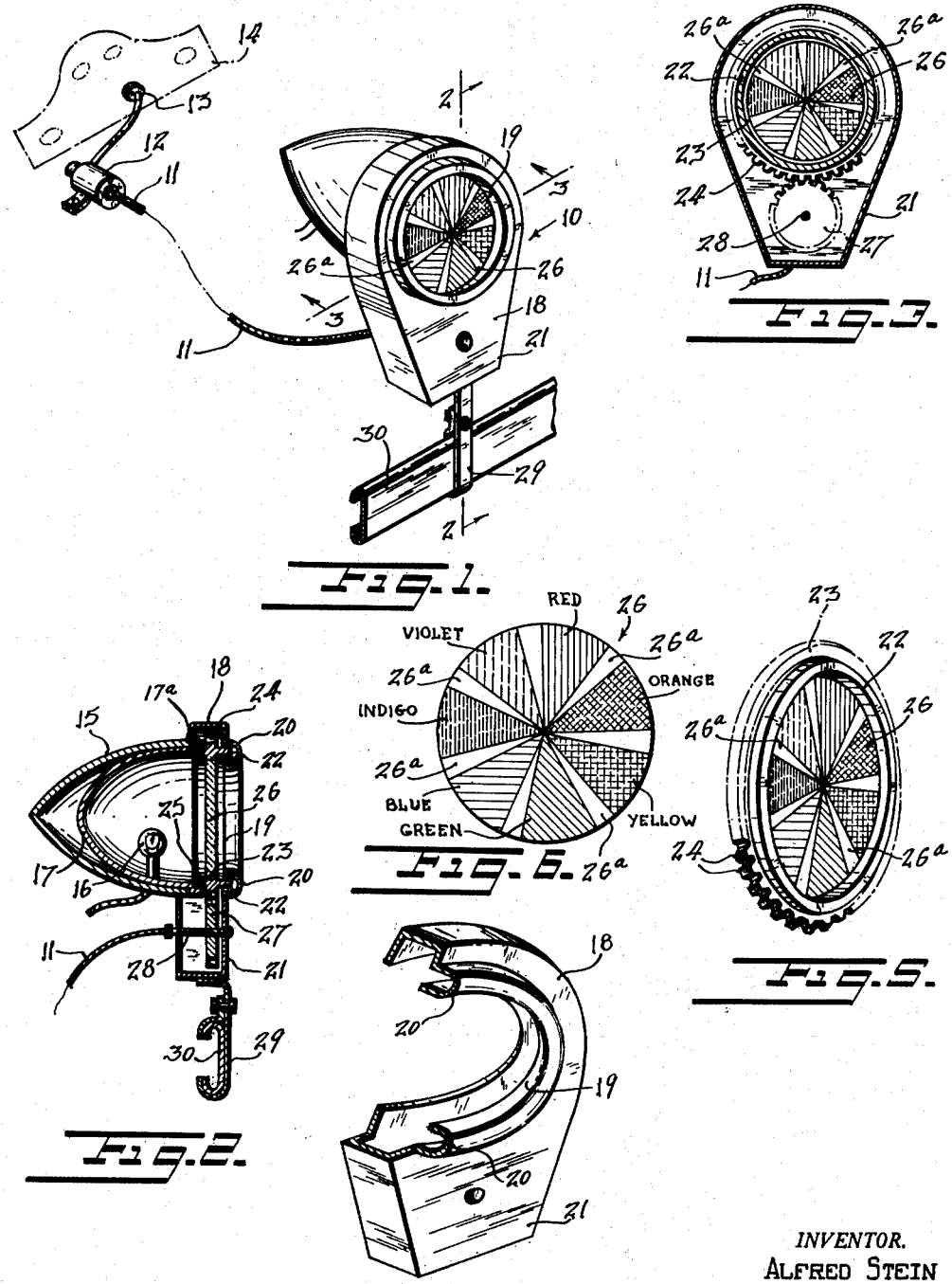
April 21, 1953     A. STEIN     2,636,110
RAINBOW COLOR DEVICE FOR FOG PENETRATING LIGHTS
Filed April 17, 1950
INVENTOR.
ALFRED STEIN
BY
ATTORNEY Patented Apr. 21, 1953

UNITED STATES PATENT OFFICE 2,636,110

RAINBOW COLOR DEVICE FOR FOG PENETRATING LIGHTS

Alfred Stein, Forest Hills, N. Y.

Application April 17, 1950, Serial No. 156,264

3 Claims. (Cl. 240—46.19)

This invention relates to automobile lighting accessories and pertains more particularly to an improved automobile fog penetrating light.

One object of the present invention is to provide a fog light adapted for shining blendingly the various spectral hues and thereby obtaining a light beam of high fog penetrating qualities.

Another object of the present invention is to provide in a fog light adapted for shining the various spectral hues, a rotary lens plurally segmented with the segments separated from each other and having each segment of a different one of said spectral hues.

Another object of the present invention is to provide in a fog light including a rotary lens having a plurality of differently hued segments, means for rotating said lens to thereby obtain a blending of said hues.

Another object of the present invention is to provide with an automobile light adapted for emitting a highly penetrating fog beam, means whereby said beam may be controlled remotely, as from an automobile dashboard.

Still another object is to provide a device adapted for furthering the advancement toward completely safe automotive travel during poor weather.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an isometric view of a fog light made in accordance with the present invention.

Fig. 2 is a sectional view taken along the lines 2—2 in Fig. 1.

Fig. 3 is a sectional view taken along the lines 3—3 in Fig. 1.

Fig. 4 is an enlarged isometric view of the lens ring.

Fig. 5 is an enlarged broken away isometric view of the lens ring and pinion housing.

Fig. 6 is an elevational view of the lens, per se.

Now with reference to the drawings in more detail, and particularly to Fig. 1, it will be seen that a fog light 10, made in accordance with the present invention is adapted to be operated through a flexible shaft 11 by any suitable motor means 12 which is controllable by switching means 13 located on an automobile dashboard, shown in dot and dash lines at 14 in Fig. 1.

The fog light 10 includes a metallic shell 15, a lamp 16, located in the shell and provided with a reflector 17 of the usual parabolic or like configuration (see Fig. 2). The rim 17ª of the reflector 17 also serves a secondary purpose which will be seen hereinafter.

Provided for having the shell 15 fitted securely in a rear opening thereof is a housing 18 (Figs. 1, 2, 3 and 4). Said housing is formed to provide a frontal opening 19, an internally open annular groove 20 just inside the perimeter of said frontal opening and a closed pendent portion 21.

Provided for bearing in said annular groove 20 is a forwardly extending annular shoulder 22 formed on a lens ring 23 (Fig. 5 also). The lens ring 23 is provided on its periphery with gear teeth 24 and on its rear face with a second but rearwardly extending annular shoulder 25. The second annular shoulder 25 is adapted to fit in and cooperate bearingly with the above mentioned rim on the reflector 17. This arrangement provides for the support of the said lens ring 23 and also permits it to be rotated freely.

Secured in the said lens ring 23 is a plurally segmented lens 26, each segment of which is colored a different one of the spectral hues; such as violet, indigo, blue, green, yellow, orange or red as clearly shown particularly in Fig. 6.

The several colored segments of the lens 26 are separated from one another by clear transparent segmental areas 26ª. The segmental areas 26ª all radiate from the center of the lens in gradually increasing widths and the transparent segmental areas 26ª are considerably smaller than the colored segments of the lens.

Provided for meshing with said gear teeth 24 on the said lens ring 23 is a pinion 27 fast on a shaft 28 journalled between the front and rear walls of the said housing pendent portion 21 (Figs. 2 and 3). Connected to a rear extension of the shaft 28 by any suitable means is the aforementioned flexible shaft 11. A suitable bracket 29 may be employed for mounting the light on an automobile bumper 30.

Now, upon the settling of a fog about the automobile, the switch 13, which may also control the lighting of the lamp 16 in addition to the running of the motor 12, may be put in its "on" position. Thus the lamp 16 is lighted and the said motor 12 commences running. Through the flexible shaft 11 the pinion 27 is turned and thereby drives the lens ring 23 enmeshed therewith. Consequently the plurally segmented and variously hued lens 26 is rotated before the beam originating from the reflected light of the lamp 16. In this manner is obtained a light beam having blended therein the various hues of the spectrum, and being of high fog penetrating qualities.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. Means rotatively mounting a lens having differently colored segmental areas in position across the open side of a light shell which encloses a source of light, comprising a parabolic reflector mounted within said shell and having a rim adjacent the open side thereof, a housing secured to the front of the shell and within which the lens is positioned, said housing having front and rear walls formed with openings aligned with the lens, a ring mounted in position about the lens, said front wall having an annular outwardly extending groove surrounding its opening with the open side of the groove facing the front face of the ring, a peripheral, radially extending groove in said housing and of larger diameter than the first mentioned annular groove and adapted to receive said ring, and an annular shoulder extending from the front face of said ring and projected into said first mentioned groove.

2. Means rotatively mounting a lens having differently colored segmental areas in position across the open side of a light shell which encloses a source of light, comprising a parabolic reflector mounted within said shell and having a rim adjacent the open side thereof, a housing secured to the front of the shell and within which the lens is positioned, said housing having front and rear walls formed with openings aligned with the lens, a ring mounted in position about the lens, said front wall having an annular outwardly extending groove surrounding its opening with the open side of the groove facing the front face of the ring, a peripheral, radially extending groove in said housing and of larger diameter than the first mentioned annular groove and adapted to receive said ring, and an annular shoulder extending from the front face of said ring and projected into said first mentioned groove, and a second annular shoulder extending rearward from the rear face of said ring and fitted into the open side of the shell in bearing contact with the rim of said reflector.

3. The combination of claim 2 wherein said first mentioned annular groove is perpendicular to said radial groove and receives said ring shoulder therein.

ALFRED STEIN.

References Cited in the file of this patent

UNITED STATES PATENTS

| Number | Name | Date |
| --- | --- | --- |
| 1,130,690 | Aufiero | Mar. 2, 1915 |
| 1,392,497 | Harmer | Oct. 4, 1921 |
| 1,756,821 | Groen | Apr. 29, 1930 |
| 2,129,195 | Bocca et al. | Sept. 6, 1938 |
| 2,534,921 | Lyman | Dec. 19, 1950 |

OTHER REFERENCES

Luckiesch et al., The Science of Seeing (1937), page 433.